United States Patent
Kakumaru et al.

(10) Patent No.: US 12,169,558 B2
(45) Date of Patent: Dec. 17, 2024

(54) THREAT ANALYSIS SYSTEM, THREAT ANALYSIS DEVICE, THREAT ANALYSIS METHOD AND THREAT ANALYSIS PROGRAM

(71) Applicant: NEC Corporation, Tokyo (JP)

(72) Inventors: Takahiro Kakumaru, Tokyo (JP); Naoki Sasamura, Tokyo (JP); Takaaki Ohara, Tokyo (JP); Yuya Yamada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 628 days.

(21) Appl. No.: 17/269,397

(22) PCT Filed: Apr. 10, 2019

(86) PCT No.: PCT/JP2019/015589
§ 371 (c)(1),
(2) Date: Feb. 18, 2021

(87) PCT Pub. No.: WO2020/039646
PCT Pub. Date: Feb. 27, 2020

(65) Prior Publication Data
US 2021/0248232 A1    Aug. 12, 2021

(30) Foreign Application Priority Data
Aug. 21, 2018  (JP) ................. 2018-154674

(51) Int. Cl.
*G06F 21/55* (2013.01)
*G06N 5/04* (2023.01)
*G06N 20/00* (2019.01)

(52) U.S. Cl.
CPC ............. *G06F 21/554* (2013.01); *G06N 5/04* (2013.01); *G06N 20/00* (2019.01); *G06F 2221/034* (2013.01)

(58) Field of Classification Search
CPC ............ G06F 21/554; G06F 2221/034; G06N 5/04; G06N 20/00; G06N 5/025
See application file for complete search history.

(56) References Cited

U.S. PATENT DOCUMENTS 7,398,171 B2 *  7/2008  Woo ................ G16B 50/30
                                            382/128
9,113,118 B2 *  8/2015  Silverstein ........... H04N 25/134
(Continued)

FOREIGN PATENT DOCUMENTS

JP    2002-140490 A    5/2002
JP    2008-304970 A    12/2008
(Continued)

OTHER PUBLICATIONS

Koito et al. ("Performance Analysis of Network Intrusion Detection System Using Random Forest Algorithms", Proceedings of the 76th National Convention of IPSU (3): Network Security, Mar. 11, 2014, pp. 3-619 to 3-620, listed in IDS filed on Apr. 9, 2024) (Year: 2014).*

(Continued)

*Primary Examiner* — Michael W Chao
*Assistant Examiner* — Peiliang Pan

(57) ABSTRACT

The rule learning unit 81 performs rough sets analysis using training data that includes threat information including a plurality of explanatory variables representing a threat event and a discrimination result of discriminating the threat information, to learn a decision rule specifying the discrimination result depending on a combination of the explanatory variables. The input unit 82 inputs the threat information to be analyzed. The analysis unit 83 applies the input threat information to the decision rule to identify the discrimination result of the threat information, and the explanatory variable as a basis for the discrimination result.

19 Claims, 9 Drawing Sheets

(56) References Cited

U.S. PATENT DOCUMENTS

| | | | |
|---|---|---|---|
| 9,317,930 B2* | 4/2016 | Kuo | G06T 7/90 |
| 9,741,099 B2* | 8/2017 | Lim | G06T 5/20 |
| 9,973,520 B2* | 5/2018 | Pevny | G06N 5/045 |
| 10,497,382 B2* | 12/2019 | Chaudhuri | H04N 21/233 |
| 10,607,349 B2* | 3/2020 | Bose | A63F 13/812 |
| 10,846,624 B2* | 11/2020 | Chamberlain | G06F 9/44505 |
| 10,929,696 B2* | 2/2021 | Zaba | G06N 20/00 |
| 11,049,391 B2* | 6/2021 | Mintz | G08G 1/0145 |
| 11,354,576 B1* | 6/2022 | Harvey | G06F 18/214 |
| 11,416,778 B2* | 8/2022 | Chamberlain | G06F 3/0683 |
| 2016/0036844 A1* | 2/2016 | Kopp | G06N 5/045 726/1 |
| 2016/0063181 A1* | 3/2016 | Subramaniam | G16B 25/10 702/19 |
| 2016/0335435 A1* | 11/2016 | Schmidtler | G06F 21/565 |
| 2019/0215328 A1* | 7/2019 | Honig | G06F 16/212 |
| 2019/0258953 A1* | 8/2019 | Lang | G06N 3/08 |
| 2020/0193842 A1 | 6/2020 | Mikami et al. | |
| 2023/0345146 A1* | 10/2023 | Cote | H04N 23/661 |

FOREIGN PATENT DOCUMENTS

| | | |
|---|---|---|
| JP | 2014-089609 A | 5/2014 |
| JP | 2015-200969 A | 11/2015 |
| JP | 2018-055424 A | 4/2018 |
| WO | 2018/034142 A1 | 2/2018 |

OTHER PUBLICATIONS

International Search Report for PCT Application No. PCT/JP2019/015589, dated Jul. 9, 2019.

Koike, Daisuke et al., Performance Analysis of Network Intrusion Detection System using Random Forest Algorithms. Proceedings of the 76th National Convention of IPSJ (3): Network Security., Mar. 11, 2014, pp. 3-619 to 3-620, Japan.

* cited by examiner

FIG. 2

| value | type | decision |
|---|---|---|
| 103.14.xxx.yyy | ipv4-addr | black |
| zzz.sports.com | domain-name | black |

D11, D12

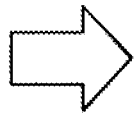

| value | Type | decision | extended_info |
|---|---|---|---|
| 103.14.xxx.yyy | ipv4-addr | black | {"detected_uris": [{"url": "http://aaa.com/", "positives": 2, "total": 67, "scan_date": "2018-03-19 13:41:25"}, ...], "collectcompletedate": "2018-03-20 02:59:01"} |
| 103.14.xxx.yyy | ipv4-addr | black | {"malware": {"results": [], "success": true}, "whois": {"contactEmail": "admin@bbb.com", "whoisServer": "whois.bbb.net", "billing": {}, "name": "XXX", "zone": {}, "admin": {"fax": "91442620xxxx", "country": "in", ...} |
| zzz.sports.com | domain-name | black | {"detected_uris": [{"url": "http://zzz.sports.com/", "positives": 2, "total": 67, "scan_date": "2018-03-20 04:21:17"} "2018-02-14 13:47:44"}, ...], "collectcompletedate": "2018-03-20 04:21:17"} |
| zzz.sports.com | domain-name | black | {"malware": {"results": [{"sample": "sssss", "source": "Facebook XXX", "sourceUrl": "https://graph.facebook.com/xxx/", "collectionDate": "2018-03-19 09:53:31"}, ...] |

| No | INFORMATION SOURCE | CONDITIONAL ATTRIBUTE | DISCRETIZATION POLICY |
|---|---|---|---|
| 1 | OBSERVED VALUE | CHARACTER STRING LENGTH | NUMERIC VALUE |
| 2 | WEBSITE A | PATH INCLUDES EXTENSION SUCH AS EXE OR THE LIKE | TRUE OR FALSE VALUE |
| 3 | WEBSITE A | PATH INCLUDES CONSECUTIVE CHARACTERS | TRUE OR FALSE VALUE |
| 4 | WEBSITE A | LENGTH OF URL | NUMERIC VALUE |
| 5 | WEBSITE B | NUMBER OF ACQUIRED RESULTS | NUMERIC VALUE |
| 6 | WEBSITE B | NUMBER OF TYPES OF INFORMATION SOURCE | NUMERIC VALUE |
| | . . . | . . . | . . . |

FIG. 4

( domain_len = [13.5-14.5) ) & ( pt_whois_tech_num = (-inf-8.5) ) & ( pt_whois_registrant_num = [1.0-+inf) ) -> ( DEC = { B } ), ( domain_len = [11.0-11.5) ) & ( vt_url_len_min = [31.5-33.5) ) & ( pt_whois_has_expiresAt = T ) -> ( DEC = { W } ), ( vt_url_len_min = [19.0-23.5) ) & ( pt_mal_results_num = (-inf-0.5) ) & ( pt_whois_has_tel = F ) & ( pt_whois_has_tech = T ) & ( pt_osint_source_num = [6.5-7.5) ) -> ( DEC = { G } ),

...

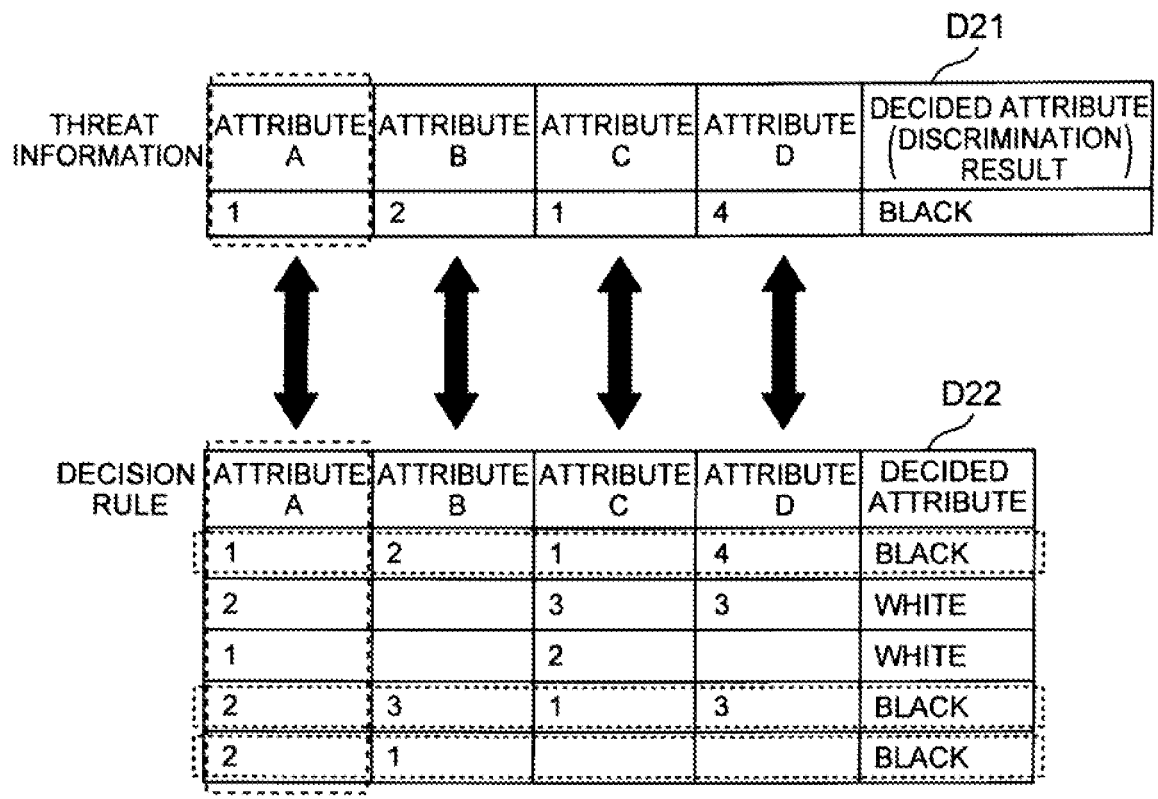

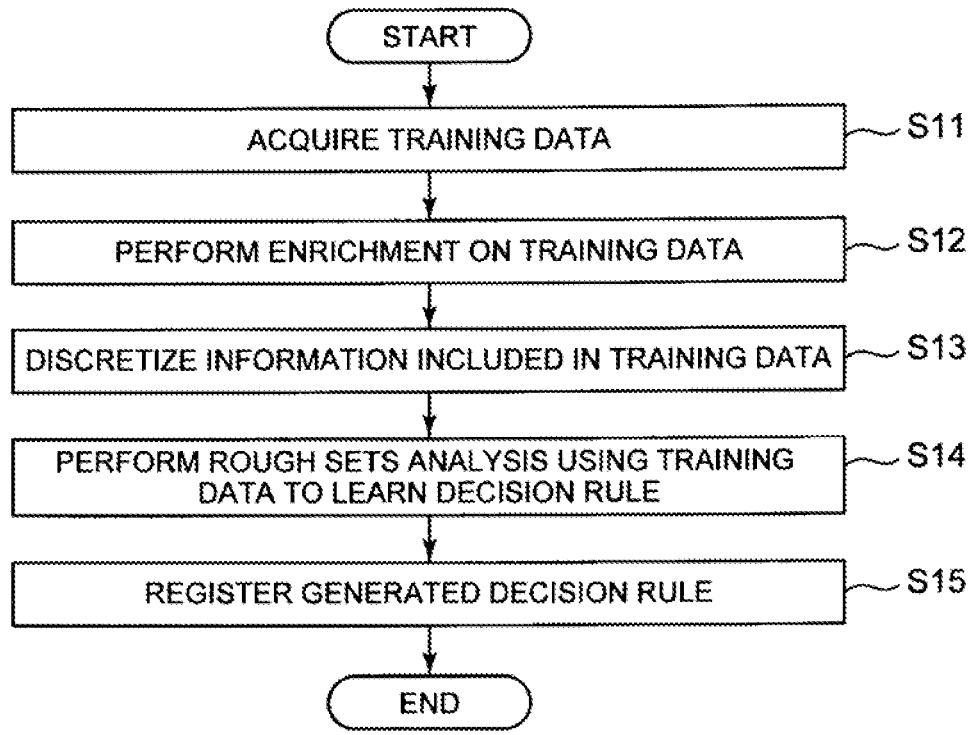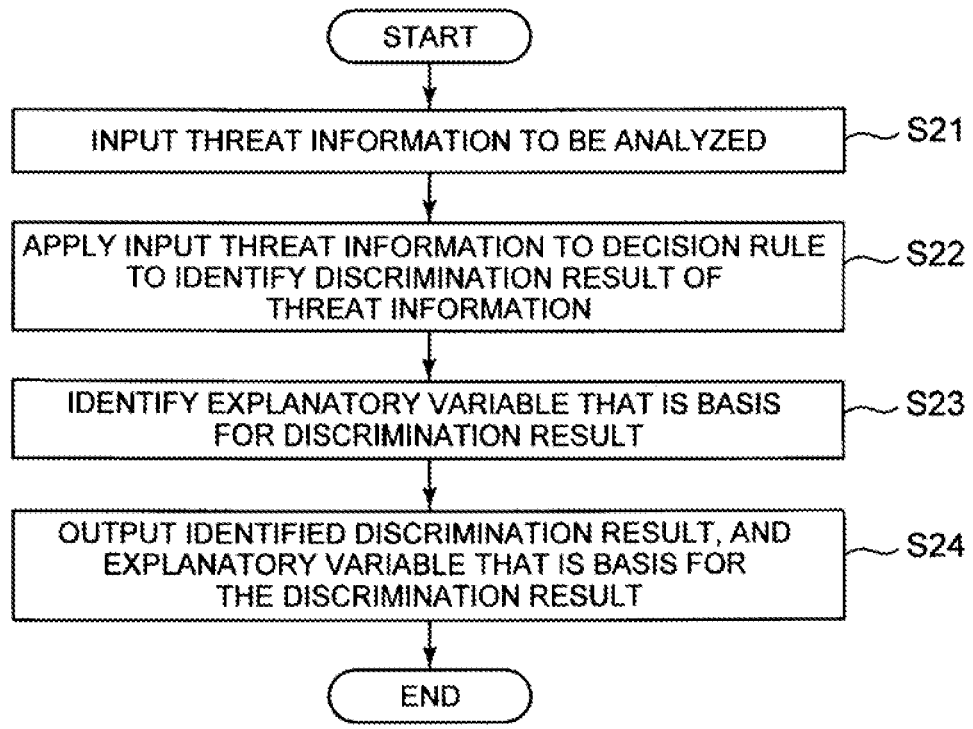

THREAT ANALYSIS SYSTEM, THREAT ANALYSIS DEVICE, THREAT ANALYSIS METHOD AND THREAT ANALYSIS PROGRAM

This application is a National Stage Entry of PCT/JP2019/015589 filed on Apr. 10, 2019, which claims priority from Japanese Patent Application 2018-154674 filed on Aug. 21, 2018, the contents of all of which are incorporated herein by reference, in their entirety.

TECHNICAL FIELD

This invention relates to a threat analysis system, a threat analysis device, a threat analysis method, and a threat analysis program for analyzing threat information about cyber attacks.

BACKGROUND ART

With the increase in damage caused by cyber attacks, in cyber-attacked companies and other organizations, security detectors and analysts are deployed to monitor whether or not external threats have been invaded and executed, and to monitor threat information. The analyst compares the threat information with known candidate threats based on past experience and other factors, to determine the necessary countermeasures, analyze the threats, discard them, and take other actions.

On the other hand, it is difficult to manually screen all the threat information because of the huge number of observed threats and inclusion of high noise. Therefore, various methods have been proposed to process the threat information efficiently. For example, the patent literature 1 describes a program analysis method for analyzing whether or not a program is a malicious program that operates contrary to intention of a user. In the method described in the patent literature 1, an order in which analytes to be analyzed is determined based on analysis recommendation information including a combination of analysis recommendation conditions and analysis recommendation degrees.

CITATION LIST

Patent Literature

Patent Literature 1: Japanese Patent Application Laid-Open No. 2014-89609

SUMMARY OF INVENTION

Technical Problem

Attackers launch a wide variety of attacks of varying severity. As a result, an analyst often extracts the characteristics of threat information based on a sensible assessment, and information triage is highly dependent on ability the analyst for the attack (information). If triage is inadequate, critical events may be missed due to being buried in miscellaneous threat information, or normal communications may be disrupted, which could interfere with operations.

It is possible to determine the analysis order of specimens to be prioritized (threat information) using the analysis method described in the patent literature 1. However, the analysis methods described in the patent literature 1 do not determine specimens to be analyzed from a large number of specimens in the first place. As a result, the analysis method described in patent literature 1 has a problem that it is difficult to narrow down the number of specimens to be analyzed, when the number of specimens to be analyzed is large.

Threat information is information that changes in a wide variety of ways. Therefore, it is desirable to automate the analysis process from a so-called sensitivity perspective, which is done by the analyst, and to be able to analyze threat information in a flexible manner.

Therefore, it is an object of the present invention to provide a threat analysis system, a threat analysis device, a threat analysis method, and a threat analysis program that can automate the analysis of threat information in the point of view of perspective of an analyst.

Solution to Problem

A threat analysis system e according to the present invention includes: a rule learning unit which performs rough sets analysis using training data that includes threat information including a plurality of explanatory variables representing a threat event and a discrimination result of discriminating the threat information, to learn a decision rule specifying the discrimination result depending on a combination of the explanatory variables, an input unit which inputs the threat information to be analyzed, and an analysis unit which applies the input threat information to the decision rule to identify the discrimination result of the threat information, and the explanatory variable as a basis for the discrimination result.

A threat analysis device according to the present invention includes: an input unit which inputs threat information to be analyzed, and an analysis unit which applies the input threat information to a decision rule to identify a discrimination result of the threat information, and explanatory variable as a basis for the discrimination result, wherein the decision rule specifies the discrimination result depending on a combination of the explanatory variables, and is generated as a result of a rough sets analysis performed using training data that includes the threat information including a plurality of explanatory variables representing a threat event and the discrimination result of discriminating the threat information.

A threat analysis method according to the present invention includes: performing rough sets analysis using training data that includes threat information including a plurality of explanatory variables representing a threat event and a discrimination result of discriminating the threat information, to learn a decision rule specifying the discrimination result depending on a combination of the explanatory variables, and applying the threat information to be analyzed to the decision rule to identify the discrimination result of the threat information, and the explanatory variable as a basis for the discrimination result.

A threat analysis program according to the present invention causes a computer to perform: a rule learning process of performing rough sets analysis using training data that includes threat information including a plurality of explanatory variables representing a threat event and a discrimination result of discriminating the threat information, to learn a decision rule specifying the discrimination result depending on a combination of the explanatory variables, an input process of inputting the threat information to be analyzed, and an analysis process of applying the input threat information to the decision rule to identify the discrimination result of the threat information, and the explanatory variable as a basis for the discrimination result.

Advantageous Effects of Invention

According to the present invention, the analysis of threat information in the point of view of perspective of an analyst can be automated.

BRIEF DESCRIPTION OF DRAWINGS

FIG. 2 It depicts an explanatory diagram of an example of a process for performing supplementation.

FIG. 3 It depicts an explanatory diagram of an example of a rule for performing an information transformation (discretization).

FIG. 4 It depicts an explanatory diagram of an example of a decision rule.

FIG. 8 It depicts an explanatory diagram of an example of identifying explanatory variables as a basis.

FIG. 9 It depicts an explanatory diagram of an example of outputting a discrimination result.

FIG. 11 It depicts a flowchart showing an example of an operation of a decision rule learning device.

FIG. 12 It depicts a flowchart showing an example of an operation of a threat analysis device.

DESCRIPTION OF EMBODIMENTS

Hereinafter, example embodiments of the present invention will be described with reference to the drawings.

In the present invention, rough sets analysis is used to perform threat analysis so that a computer can automatically process analysis in the point of view of the so-called sensible point, which is done by an analyst. Rough sets analysis is one of analysis methods that can analyze the structure in human thinking and can provide a basis for the analyst to make a decision. In general, rough sets analysis is an analysis method for data mining of human sensibilities, but the inventors have been inspired to apply rough sets analysis to threat analysis, which is the field of cyber security.

Figure 1:
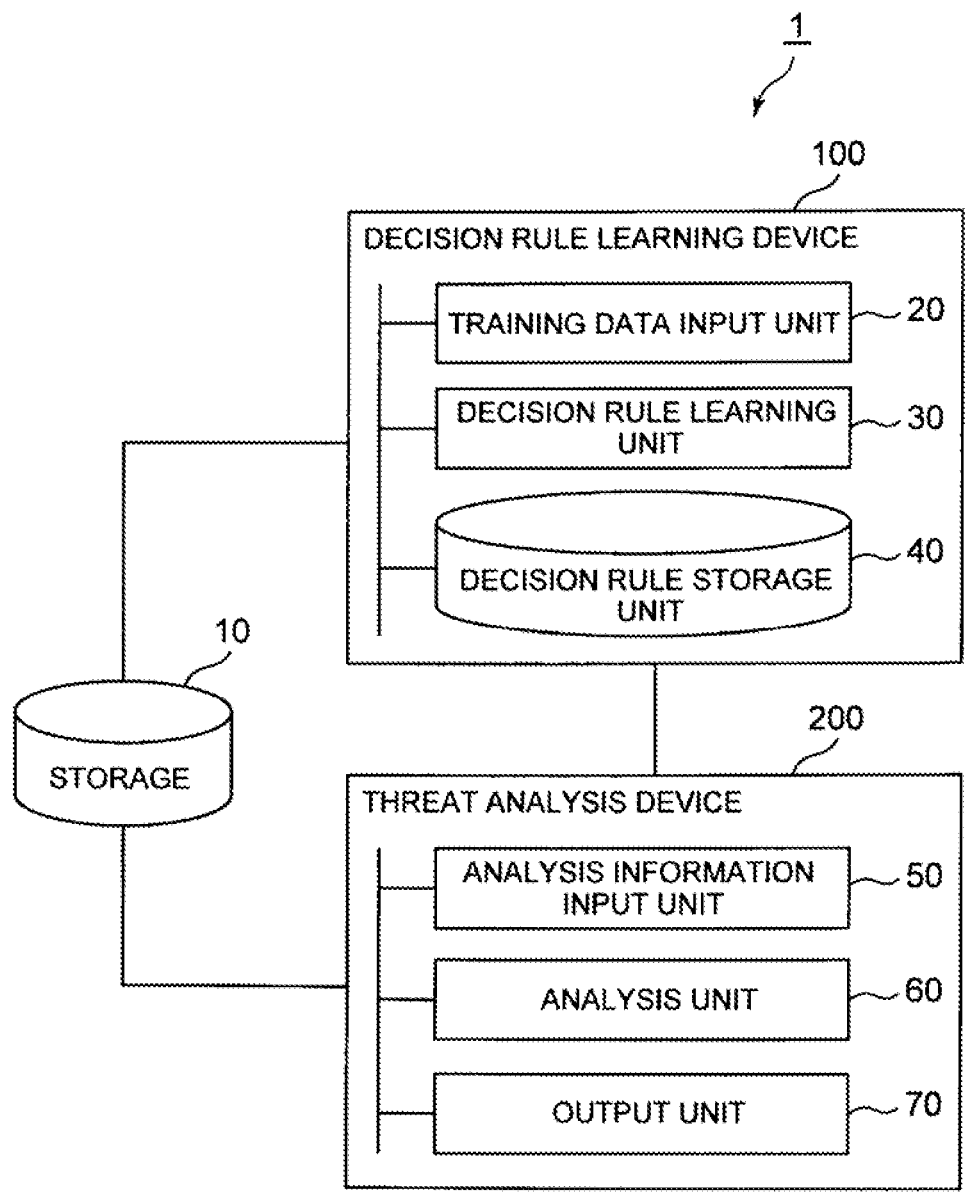
FIG. 1 It depicts a block diagram showing an example embodiment of a threat analysis system according to the present invention.

FIG. 1 is a block diagram showing an example embodiment of a threat analysis system according to the present invention. The threat analysis system 1 of this example embodiment comprises a storage 10, a decision rule learning device 100, and a threat analysis device 200. The storage 10, the decision rule learning device 100, and the threat analysis device 200 are communicatively connected each other. The decision rule learning device 100 and the threat analyzer 200 may be realized in a single device, and the storage 10 may be included in the decision rule learning device 100 or the threat analysis device 200.

The storage 10 stores the threat information. The threat information includes a plurality of explanatory variables representing the threat event, for example, the threat information is detected by a security detector or the like. The content of the explanatory variables is arbitrary, such as an Internet Protocol (IP) address or a domain name indicating the information source, a length of a character string included in the threat information, and a size of the threat information.

Specifically, the storage 10 stores data including the threat information and a discrimination result of the threat information as training data used by the decision rule learning unit 30, as described below, for learning. The storage 10 also stores the threat information to be analyzed by the threat analysis device 200, which will be described below. The threat information may include information added by the training data input unit 20, which is described below.

The discrimination result included in the training data is, for example, set by an analyst or others. A result of the discrimination by the threat analysis device 200, which is described below, may be used as the discrimination result. The discrimination result may be information indicating a presence or absence of a threat, such as, for example, a threat event (black), a possible threat event (gray), or not a threat event (white). The discrimination result may also be information indicating whether the threat corresponds to a classification (hereinafter, sometimes referred to as the threat category) depending on a property of the threat event or not (for example, whether the threat is malware or not, whether the threat is a targeted type, etc.).

The decision rule learning device 100 includes a training data input unit 20, a decision rule learning unit 30, and a decision rule storage unit 40.

The training data input unit 20 acquires the training data stored in the storage 10 and inputs the training data to the decision rule learning unit 30. The training data input unit 20 may input the training data acquired from the storage 10 to the decision rule learning unit 30 as it is.

The training data input unit 20 may supplement the training data acquired from the storage 10 and input the supplemented training data to the decision rule learning unit 30. Specifically, the training data input unit 20 may perform enrichment, which adds new information to the training data acquired from the memory unit 10, or information transformation (sometimes referred to as discretization), which generates new information from some information based on a predetermined rule.

FIG. 2 is an explanatory diagram of an example of a process for supplementing the training data. For example, as shown in FIG. 2, suppose both information D11, whose IP address is "103.14.xxx.yyy" and information D12, whose domain name is "zzz sports.com" exist as training data indicating threat information (black).

For pieces of information, the training data input unit 20 supplements the training data with relevant information (sometimes referred to as attribute information) identified based on each explanatory variable (IP address, domain name). The training data input unit 20 acquires the relevant information using any method. For example, the training data input unit 20 may acquire the relevant information from a memory unit (not shown) that stores various information corresponding to the explanatory variables, or may access an external server (not shown) that inspects files or websites to acquire the relevant information.

For example, VirusTotal (a registered trademark in the US) is known as a website that detects malware for files and websites. As other example, Whois (a registered trademark) is known as a protocol for searching for information about IP addresses and domain name registrants. Passive Total is also known as a platform for storing information on the Internet. The training data input unit 20 may use these functions to acquire relevant information.

Further, the training data input unit 20 may generate multiple types of training data by supplementing one training data with different types of relevant information. The example shown in FIG. 2 illustrates that the training data shown in information D13 and D14 is generated as a result of two types of enrichment for information D11, and the training data shown in information D15 and D16 is generated as a result of two types of enrichment for information D12.

FIG. 3 is an explanatory diagram of an example of a rule for performing an information transformation (discretization). The example shown in FIG. 3 illustrates rules regarding the observed values for performing information transformation for each relevant information acquired from multiple websites. For example, the rule shown in No. 2 indicates that a true or false value (a binary value of 0 or 1) is determined for relevant information acquired from a website A according to whether the information indicated by "Path" includes an extension such as an exe or the like. Otherwise, the training data input unit 20 may transform information into a numerical value or a character string for either explanatory variables or related information, or both the existing explanatory variables and related information, based on a predetermined transformation rule. Further, the training data input unit 20 may also transform information to a range or a binary value other than a true or false value, a numeric value, and a character string.

Furthermore, the training data input unit 20 may discretize at least one of the above explanatory variable and related information from multi-value data to other multi-value data based on a predetermined transformation rule. An example of discretization from multi-value data to other multi-value data is to transform country information to region information (North America, Europe, Asia . . . , etc.). The method of discretization is not limited to the above examples.

Although FIG. 3 illustrates conversions of only some pieces of information, the transformation rules based on the conditional attributes are not limited to those shown in FIG. 3. The closer the conditional attributes are to sensible perspective of an analyst, the more desirable they are. As shown in FIG. 3, there is information which is difficult to use as it is in relevant information acquired by using the external information. When the training data input unit 20 performs a transformation on such relevant information, the external information can be used as an explanatory variable that is useful for rough sets analysis.

Since the relevant information that can be acquired depending on the explanatory variables is different, the training data input unit 20 may generate the training data by changing the relevant information to be supplemented for each type of explanatory variable included in the threat information. For example, when an IP address and a domain name exist as a source of the threat information, the training data input unit 20 may supplement the training data including the IP address and the training data including the domain name with different relevant information, respectively.

The training data input unit 20 may supplement one training data with all relevant information that can be acquired. By supplementing a lot of relevant information, it is possible to improve the accuracy of the analysis. On the other hand, if all relevant information is included in one training data, unnecessary information may be included in determining a certain threat event. For example, suppose that all relevant information that can be acquired from the domain name and IP address is included in a single training data. In this case, the decision rule generated by the decision rule training unit 30, which will be described below, may include relevant information as an explanatory variable that is not necessary when determining a threat based on either the domain name or the IP address.

It is possible for the training data input unit 20 to add only useful information for performing decision by changing the relevant information that is supplemented to the training data for each type of explanatory variable included in the threat information. In other words, it is possible to exclude explanatory variables that do not affect discrimination or that have a very small effect on discrimination from the decision rule, thereby reducing the amount of decision rules generated and reducing the processing time required for deciding while maintaining analysis accuracy. For example, in the above example, the training data input unit 20 is preferable to generate training data supplemented with relevant information for each IP address and domain name, respectively.

The decision rule learning unit 30 performs a rough sets analysis using the training data input by the training data input unit 20 to learn a decision rule specifying a discrimination result according to a combination of explanatory variables. Here, the input training data is data including threat information including a plurality of explanatory variables representing a threat event and a discrimination result of the threat information. The training data may include relevant information supplemented by the training data input unit 20. The relevant information may also be discretized.

One specific example of the rough sets analysis performed by the decision rule learning unit 30 will be described bellow. The decision rule learning unit 30 classifies the training data according to the discrimination results (objective variables). For example, if there are three types of discrimination results, black, white, and gray, the decision rule learning unit 30 classifies the training data into three types of groups.

Next, the decision rule learning unit 30 compares, for each training data, the explanatory variables of the training data and explanatory variables of other training data whose discrimination result is different from the training data, respectively. For example, the decision rule learning unit 30 extracts one training data whose discrimination result is "black", and compares its explanatory variables with explanatory variables of all of other training data whose discrimination result is "white" or "gray" to identify explanatory variables that are different from explanatory variables of other training data. The decision rule learning unit 30 aggregates the comparison results for each group and excludes the explanatory variables with low frequency (explanatory variables with a small number identified as different). This frequency can be determined in advance. The decision rule learning unit 30 uses logical operations to aggregate the comparison results.

FIG. 4 is an explanatory diagram of an example of a decision rule. The example shown in FIG. 4 illustrates that the discrimination results according to logical operations (combinations) of the explanatory variables are defined in the decision rule as decision conditions. For example, the first decision condition indicates that information that "the domain name is composed of 14 characters, a number of technical information regarding the domain is 8 or less, and a number of registrant information is 1 or more" is determined to be black (threat information). Also, for example, the second decision condition indicates that information that "the domain name is composed of 11 characters, the shortest URL (uniform resource locator) detected on a given website is composed of 32-33 characters, and the domain's expiration date of the domain is registered" is determined to be white (not threat information). There may also be a condition for deciding it as gray, as in the third decision condition.

The decision rules generated by the rough sets analysis by the decision rule learning unit have different characteristics according to the content of the input training data. The contents of the individual decision rules determined according to the content of the training data will be described below.

Figure 5:
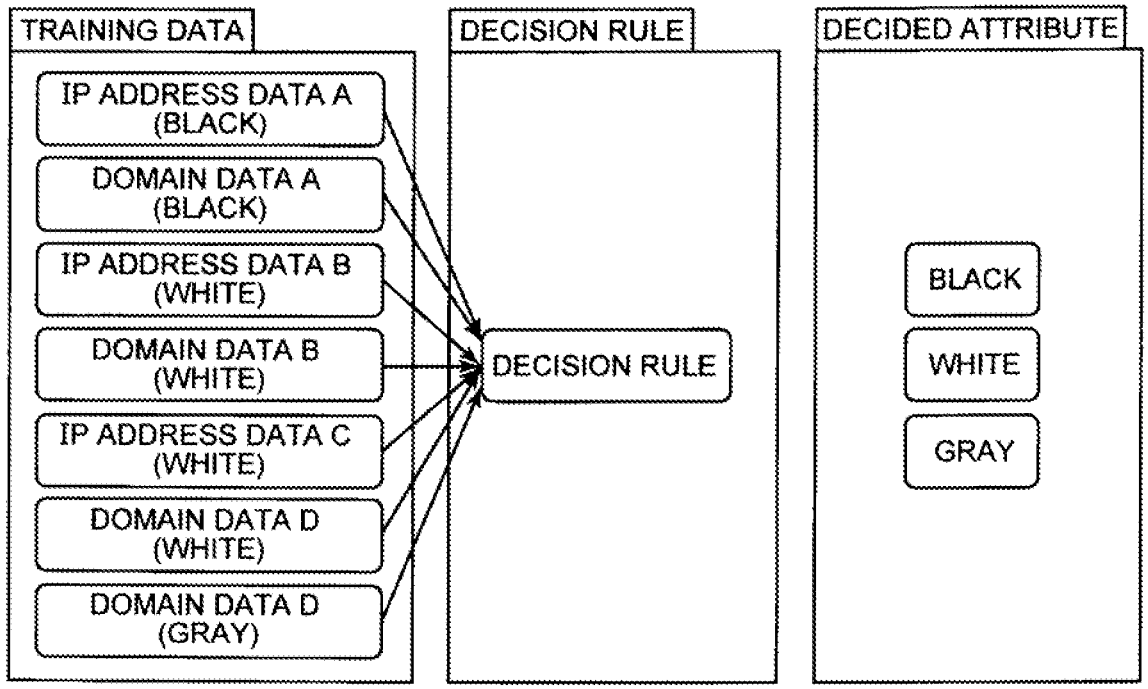
FIG. 5 It depicts an explanatory diagram of an example of a process for generating a decision rule.

FIG. 5 is an explanatory diagram of an example of a process for generating a decision rule. When an objective variable included in the training data indicates presence or absence of a threat, or possibility (gray) of a threat, the decision rule learning unit 30 may learn one decision rule that determines presence or absence of a threat, or possibility (gray) of a threat. Here, the one decision rule refers to a set of individual decision conditions.

Figure 6:
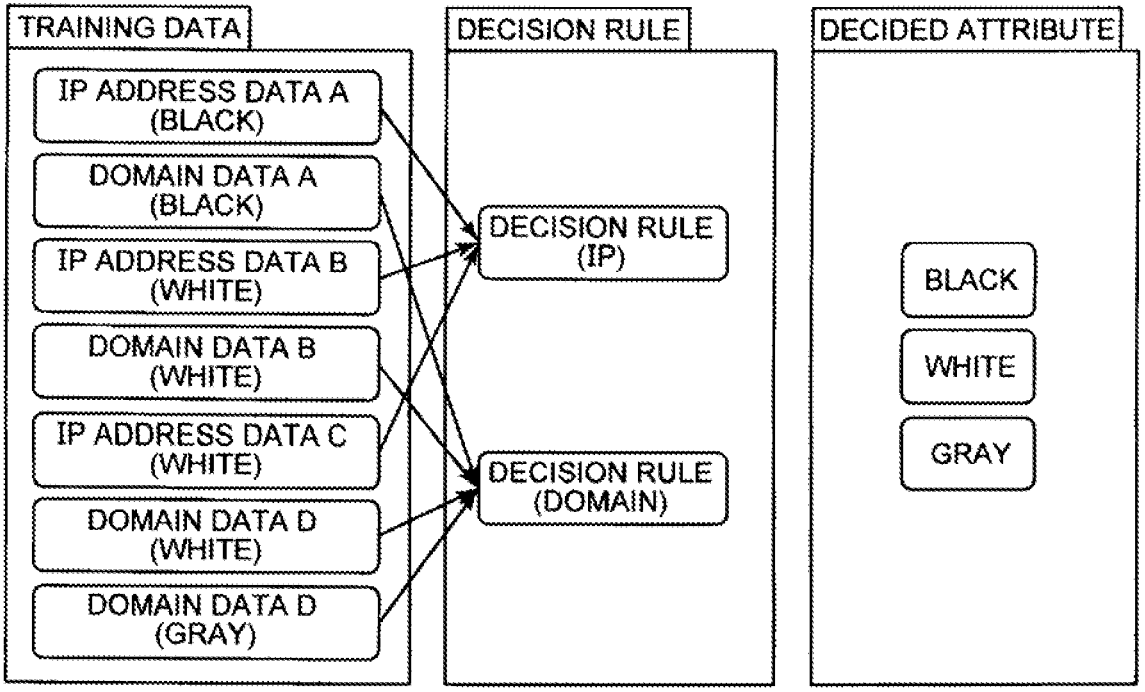
FIG. 6 It depicts an explanatory diagram of another example of a process for generating decision rules.

FIG. 6 is an explanatory diagram of another example of a process for generating decision rules. When an objective variable included in the training data indicates presence or absence of a threat, or possibility (gray) of a threat, the decision rule learning unit 30 may learn a decision rule for each type of predetermined explanatory variable included in the threat information. In the case of the example shown in FIG. 6, the decision rule learning unit 30 may learn a decision rule for analyzing threat information including an IP address in the explanatory variable and a decision rule for analyzing threat information including a domain name in the explanatory variable, respectively.

Figure 7:
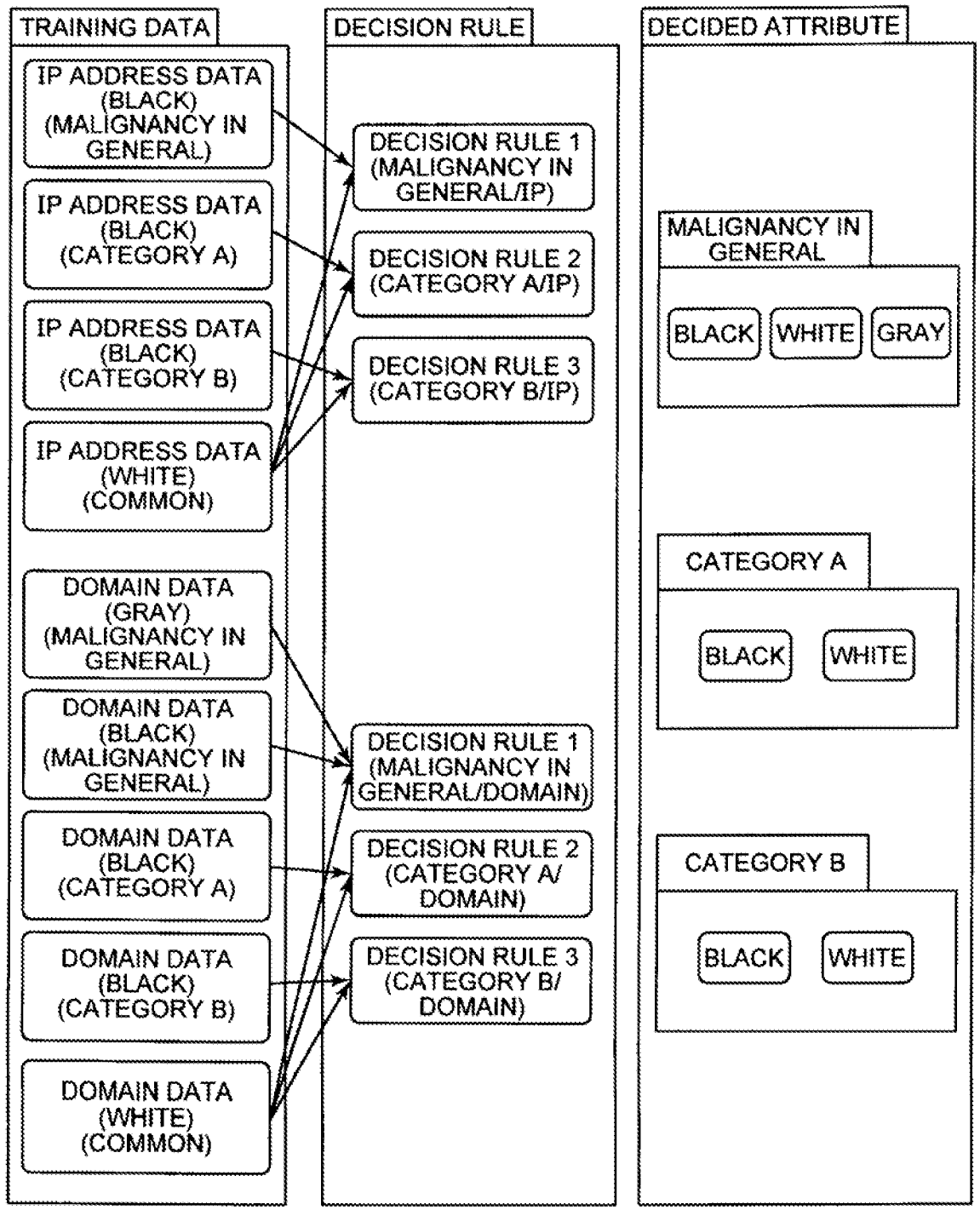
FIG. 7 It depicts an explanatory diagram of another example of a process for generating decision rules.

FIG. 7 is an explanatory diagram of yet another example of a process for generating decision rules. When an objective variable included in the training data indicates whether or not a particular threat category is applicable, the decision rule learning unit 30 may learn a decision rule to determine whether or not the data falls under that threat category. In this case, decision rules are generated for a number of threat categories to be analyzed. In this case, also, the decision rule learning unit 30 may learn the decision rule for each type of predetermined explanatory variable. For example, as shown in FIG. 7, if two types of analysis of threat information including IP addresses in the explanatory variables and threat information including domains in the explanatory variables are performed, two types of decision rules are generated for each threat category, respectively.

As shown in FIG. 7, the data decided to be no threat (white) should be commonly used by all threat categories, because it is difficult to classify the data by threat category. In addition, since it is rare to decide data whether it is gray or not for each threat category, the gray training data is used as training data for the category of malignancy in general. Here, the malignancy in general is a group of training data that is grouped together regardless of any classification of threat categories.

In the case of generating decision rules from multiple perspectives, different decision conditions may be generated depending on the training data used for training. For example, there may be cases where a black decision is made in more than one category, or different results may be introduced in the decision for each of the malignancy in general and threat categories. When the decision rule learning unit 30 generates decision rules for multiple perspectives such as this the above, it becomes to be possible to decide the threat information based on multiple perspectives.

The decision rule storage unit 40 stores the decision rules generated by the decision rule learning unit 30.

The threat analysis device 200 includes an analysis information input unit 50, an analysis unit 60, and an output unit 70.

The analysis information input unit 50 inputs the threat information to be analyzed to the analysis unit 60. The analysis information input unit 50 may acquire the threat information stored in the storage 10 and input it to the analysis unit 60, or may acquire the threat information from another system or device (not shown) through a communication network and input it to the analysis unit 60.

When the decision rule learning unit 30 generates a decision rule using enriched (supplemented) relevant information, the analysis information input unit 50 may supplement the relevant information to the threat information and input the supplemented threat information to the analysis unit 60. When the decision rule learning unit 30 perform enrichment (information transformation) to the explanatory variables or relevant information included in the training data, based on the transformation rules, the analysis information input unit 50 may transform the relevant information of the threat information, based on the transformation rules, and input the transformed threat information to the analysis unit 60.

The analysis unit 60 applies the threat information input from the analysis information input unit 50 to the decision rule determined by the decision rule learning unit 30 to identify a discrimination result of the threat information, and an explanatory variable that is the basis for the discrimination result. The analysis unit 60, for example, applies the threat information to the decision rule shown in FIG. 4, and identifies a discrimination result of the threat information using a decision condition that matches an explanatory variable included in the threat information. As shown in FIG. 4, when the decision rule is learned using training data including discrimination results indicating presence or absence of a threat, or possibility of a threat, the analysis unit 60 applies the input threat information to the decision rule to identify the discrimination result indicating presence or absence of a threat, or possibility of a threat.

When a decision rule is learned for each type of explanatory variable included in the threat information, the analysis unit 60 selects a decision rule according to the explanatory variable included in the input threat information, and applies the threat information to the selected decision rule. For example, when the threat information includes an IP address, the analysis unit 60 can select a decision rule for analyzing the threat information including the IP address and apply the threat information to the decision rule.

Further, when a decision rule is learned for each threat category, the analysis unit 60 may apply the input threat information to the decision rule for each threat category, respectively, and may identify a discrimination result indicating whether or not it is applicable to each threat category. If no decision conditions matching the decision rules exist, the analysis unit 60 may identify the discrimination result as "not discriminable".

The threat information decided as "not discriminable" can be used as training data. For the "not discriminable" threat information, we executed experiment for generating a training data with three types of discrimination results (white, black and gray) and using them to generate decision rules. The generated decision rules were able to identify the discrimination results set in the training data. Therefore, it can be said that the not discriminable data can be used as a decision rule for "gray".

The analysis unit 60 may identify the explanatory variable, as a basis for the discrimination result, included in a decision condition that is the base for identification of the discrimination result as it is. For example, if the discrimination result is determined based on the first decision condition shown in FIG. 4, the analysis unit 60 may identify three explanatory variables, "domain name," "number of technician information," and "number of registrant information". At this time, the analysis unit 60 may identify values indicated by the respective explanatory variables. In this example embodiment, since the discrimination is performed using a decision rule, it is easier to indicate a basis.

The analysis unit 60 may identify the explanatory variables that have most influenced the discrimination results as the basis for the discrimination results. The method of identifying the explanatory variables that the analysis unit 60 uses as a basis for the discrimination results will be described below, using a specific example.

FIG. 8 is an explanatory diagram of an example of identifying explanatory variables as a basis. Suppose that the analysis information input unit 50 inputs the threat information D21 shown in FIG. 8. Here, the decision rule D22 shown in FIG. 8 is stored in the decision rule storage unit 40, and the analysis unit 60 is assumed to perform analysis based on the decision rule D22. Since the threat information D21 matches the decision condition in the first line of the decision rule D22, the analysis unit 60 determines the threat information D21 to be "black".

Next, the analysis unit 60 extracts from the decision rules a decision condition that includes at least one or more explanatory variables used to derive the discrimination result among the decision conditions in which the discrimination result matches. In the decision rule illustrated in FIG. 8, the explanatory variables indicating the attribute A, the attribute B, the attribute C, and the attribute D are used to derive the discrimination result. Among them, the decision conditions in which the discrimination result matches with "black" are the decision conditions in lines 4 and 5. Therefore, the analysis unit 60 extracts the decision conditions in the fourth and fifth lines, in addition to the decision condition in the first line used to derive the discrimination result.

Next, the analysis unit 60 calculates a score for each explanatory variable, using the number of explanatory variables included in the extracted decision condition as the denominator and the number of matches of the explanatory variables as the numerator. In the example shown in FIG. 8, for example, for attribute A, the number of explanatory variables included in the decision condition is three, of which there is one decision condition that matches attribute A="1". Therefore, the analysis unit 60 calculates the score for attribute A as ⅓. Similarly, the analysis unit 60 calculates the score for attribute B as ⅓, the score for attribute C as 2/2, and the score for attribute D as ½.

Each decision rule shown in FIG. 8 may include as an attribute a occurrence ratio (frequency of occurrence) of the decision rule relative to the total training data. For example, each decision rule may be sorted by the occurrence ratio (frequency of occurrence) and the analysis unit 60 may calculate a score by weighting the occurrence ratio (frequency of occurrence) as a coefficient. That makes to be possible to apply the decision rule with a higher occurrence ratio (frequency of occurrence) as priority.

Then, the analysis unit 60 identifies the explanatory variable with the highest calculated score as the explanatory variable that has had the greatest influence on the discrimination result. In the example shown in FIG. 8, since the score of the attribute C is the largest, the analysis unit 60 identifies the explanatory variable that has most influenced the discrimination result as the attribute C. The analysis unit 60 identifies the explanatory variable that has most influenced the discrimination result.

The output unit 70 outputs the identified discrimination result. The output unit 70 also outputs an explanatory variable as a basis for the identified discrimination result. The method by which the output unit 70 outputs the discrimination result is optional. For example, the output unit 70 may output "white", "black", and "gray" results together with the threat information. When the analysis unit 60 performs the analysis using a plurality of decision rules, the output unit 70 may output the discrimination results for each decision rule. The output unit 70 may output not only the discrimination results but also information related to the analysis together.

FIG. 9 is an explanatory diagram of an example of outputting a discrimination result. The discrimination result shown in FIG. 9 is in JSON (JavaScript Object Notation) format. JavaScript is a registered trademark. The example shown in FIG. 9 shows the discrimination results using three types of decision rules (malignancy in general, category A and category B), indicating that each decision in malignancy in general and category A is "black" (1). The example shown in FIG. 9 also shows that the discrimination results include the method of analysis, and the date and time when the analysis was completed. It is assumed here that the "white" determination is equivalent to 0, the "black" determination is equivalent to 1, and the "gray" determination is equivalent to 2.

An identifier that can identify the analysis method may be included in the discrimination result. In the example shown in FIG. 9, it is shown that the discrimination was performed by "xxxxyyyy" as a discrimination method ("analyzemethod"). Thus, by including the discriminant method in the discrimination results, for example, it is possible to utilize a mixture of analysis methods other than rough sets analysis.

Figure 10:
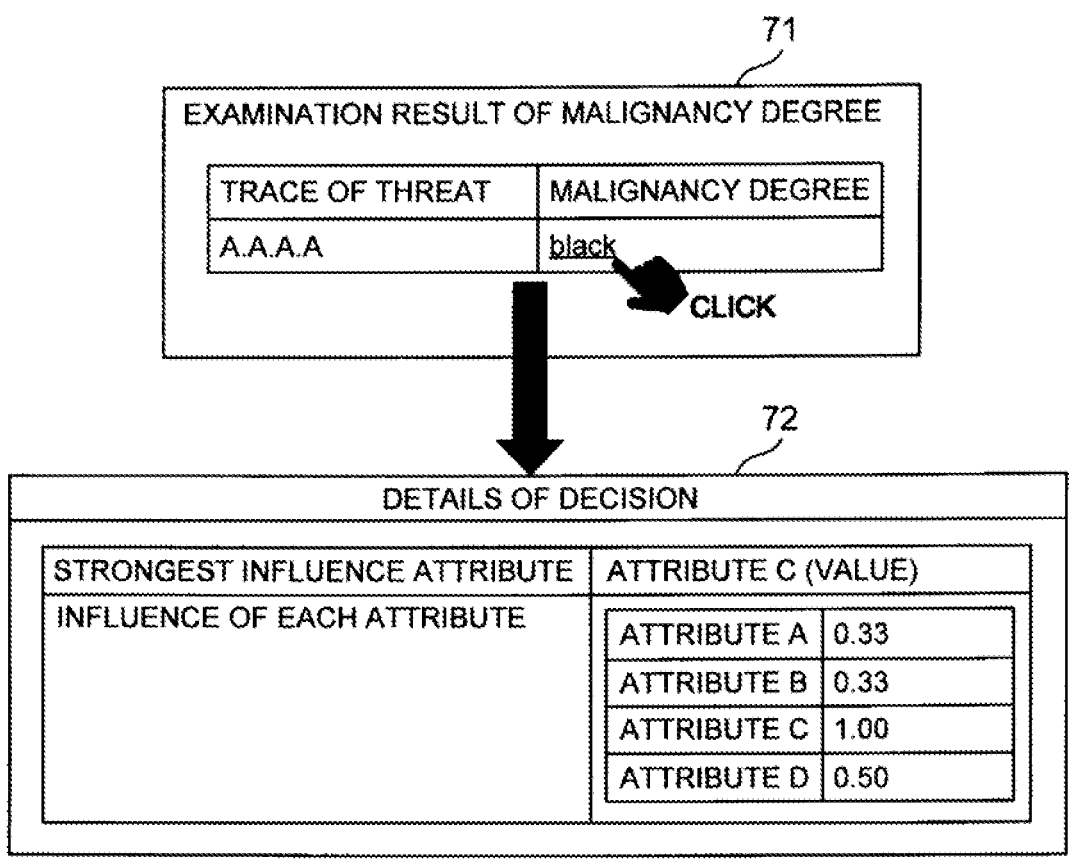
FIG. 10 It depicts an explanatory diagram of an example of displaying explanatory variables as a basis.

The output unit 70 may output the explanatory variables as a basis for the discrimination results identified by the analysis unit 60. FIG. 10 is an explanatory diagram of an example of displaying explanatory variables as a basis. In the example shown in FIG. 10, the output unit 70 displays a list of a threat event (here, IP address) included in the threat information and a discrimination result thereof on the screen 71.

Further, in the example shown in FIG. 10, when the threat information is selected (for example, a click operation by a pointing device or the like), the output unit 70 outputs the explanatory variables that are the basis for the discrimination results on the screen 72. In the example shown in FIG. 10, the output unit 70 outputs the degree of influence (score) for each of the explanatory variables shown in FIG. 8 and the attribute that has the most influence, respectively. The method of outputting the score shown in FIG. 10 is an example, and the output unit 70 may output the score using a graph or the like instead of a list format.

The output unit 70 may output not only the explanatory variables as the basis, but all the explanatory variables as well. At this time, the output unit 70 may display the explanatory variables as the basis and other explanatory variables in distinct modes. In this way, by displaying the related explanatory variables so that an overall trend of the threat information can be grasped, it is possible to make the analysis by the analyst be effectively conducted.

The training data input unit 20 and the decision rule learning unit 30 are realized by a CPU of a computer that operates according to a program (the decision rule learning program). For example, the program may be stored in the storage 10, and the CPU can read the program and operate as the training data input unit 20 and the decision rule learning unit 30 in accordance with the program.

Further, the analysis information input unit 50, the analysis unit 60 and the output unit 70 are realized by a CPU of a computer that operates according to a program (a threat analysis program, an analysis program). For example, the program may be stored in the storage 10, and the CPU can read the program and operate as the analysis information input unit 50, the analysis unit 60, and the output unit 70 according to the program.

The training data input unit 20, the decision rule learning unit 30, the analysis information input unit 50, the analysis unit 60, and the output unit 70 may each be realized with dedicated hardware. The storage 10 and the decision rule storage unit 40 are realized by a magnetic disk device or the like.

Next, the operation of the threat analysis system of this example embodiment will be described. FIG. 11 is a flowchart showing an example of an operation of a decision rule learning device 100 in this example embodiment. Here, it is assumed that the threat information (i.e., training data) with a set of objective variables has already been stored in the storage 10.

The training data input unit 20 acquires training data stored in the storage 10 (step S11) and performs supplementation (enrichment) on the acquired training data (step S12). Further, the training data input unit 20 discretizes information included in the supplemented training data (step S13). The decision rule learning unit 30 performs a rough sets analysis using the training data to learn a decision rule (step S14). The decision rule learning unit 30 registers the generated decision rule in the decision rule storage unit 40 (step S15).

FIG. 12 is a flowchart showing an example of an operation of a threat analysis device 200 in this example embodiment. The analysis information input unit 50 inputs the threat information to be analyzed to the analysis unit 60 (step S21). The analysis information input unit 50 may enrich and discretize the threat information in accordance with the decision rule. The analysis unit 60 applies the input threat information to the decision rule to identify a discrimination result of the threat information (step S22). The analysis unit 60 also identifies the explanatory variable that is the basis for the discrimination result (step S23). The output unit 70 outputs the identified discrimination result, and the explanatory variable that is the basis for the discrimination result (step S24).

As described above, in this example embodiment, the decision rule learning unit 30 learns the decision rule by performing a rough sets analysis using the training data. Then, the analysis information input unit 50 inputs the threat information to be analyzed, and the analysis unit 60 applies the input threat information to the decision rule and identifies a discrimination result of the threat information and an explanatory variable as a basis for the discrimination result. Thus, the analysis of the threat information in the point of view of perspective of an analyst can be automated.

For example, by using the threat analysis system 1 of this example embodiment to support the discrimination process of threat information, less important threat information can be automatically discarded. This reduces the load on the analyst and enables the analyst to notice new attacks, to respond quickly and to control them flexibly.

Threat information is also information that changes over time. For example, even websites that were determined to be potentially threatening in the past may be repaired over time and the threat may be eliminated. In some cases, it is difficult for general learning algorithms to follow up such a frequently changing environment.

On the other hand, in this example embodiment, the decision rule learning unit 30 learns the decision rule by rough sets analysis. Rough sets analysis is a method of analysis in which a certain analysis can be performed even if the training data is ambiguous, and the one with low frequency is eliminated. Therefore, even if the objective variable (discrimination result) changes as the environment changes, old data is eliminated by adding new training data from time to time, resulting in the decision rule being able to follow up the change in the environment.

Figure 13:
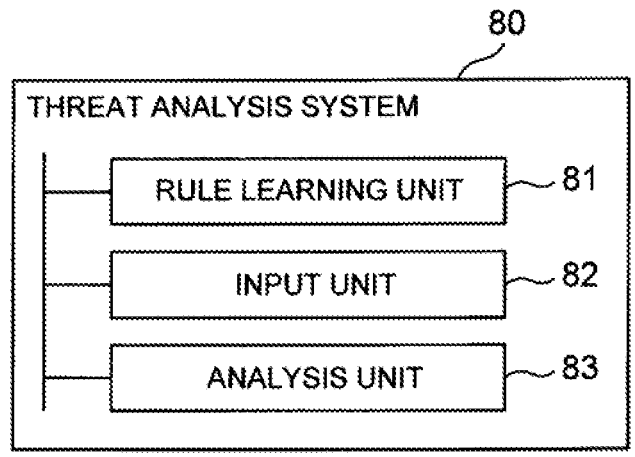
FIG. 13 It depicts a block diagram showing a summarized example of a threat analysis system according to the present invention.

Next, a summary of the present invention will be described. FIG. 13 is a block diagram showing a summarized example of a threat analysis system according to the present invention. The threat analysis system 80 according to the present invention (for example, threat analysis system 1) comprises a rule learning unit 81 (for example, decision rule learning unit 30) which performs rough sets analysis using training data that includes threat information including a plurality of explanatory variables representing a threat event and a discrimination result of discriminating the threat information, to learn a decision rule specifying the discrimination result depending on a combination of the explanatory variables, an input unit 82 (for example, analysis information input unit 50) which inputs the threat information to be analyzed, and an analysis unit 83 (for example, analysis unit 60) which applies the input threat information to the decision rule to identify the discrimination result of the threat information, and the explanatory variable as a basis for the discrimination result.

Such a configuration can automate the analysis of threat information in the point of view of perspective of an analyst.

The threat analysis system 80 may further comprise a supplement unit (for example, the training data input unit 20) which supplements (enriches) the training data with relevant information identified based on the explanatory variable. In the configuration, the rule learning unit 81 may perform the rough sets analysis using supplemented training data, and the input unit 82 may input the threat information supplemented with the relevant information.

Such a configuration can supplement the training data with information that cannot be directly observed by a security detector or the like, thus improving the accuracy of the threat information analysis.

Further, the supplement unit may transform (discretize) at least one of the explanatory variable and related information to a true or false value, a character string, a numeric value, a range, or a binary value, based on a predetermined transformation rule. In the configuration, the rule learning unit 81 may perform the rough sets analysis using transformed training data, and the input unit 82 may input the threat information transformed based on the transformation rule. Such a configuration allows to integrate explanatory variables which show different content into common information, thus allowing for common conditions to be used in the analysis of the threat information and improving the accuracy of the analysis.

The rule learning unit 81 may learn the decision rule for each type of predetermined explanatory variable (for example, IP address, domain name) included in the threat information. In the configuration, the analysis unit 83 may select the decision rule according to the explanatory variable included in the input threat information, and applies the threat information to selected decision rule.

Such a configuration makes it possible to change the relevant information to be supplemented to the training data for each type of explanatory variable included in the threat information, so that only information useful for decision can be added. In other words, it is possible to exclude from the decision rules explanatory variables that do not affect discrimination or that have a very small effect on discrimination, thereby reducing the amount of generated decision rules and the processing time for decision while maintaining analysis accuracy.

The rule learning unit 81 may learn the decision rule using the training data including presence or absence ("black" or "white") of a threat, or possibility (gray) of a threat. In the configuration, the analysis unit 83 may apply the input threat information to the decision rule to identify the discrimination result indicating presence or absence of a threat, or possibility of a threat.

The rule learning unit 81 may learn the decision rule, for each threat category that is a classification depending on a property of the threat event, using the training data that includes the discrimination result indicating whether or not a threat category is applicable. In the configuration, the analysis unit 83 may apply the input threat information to the decision rule for each of the threat category to identify the discrimination result indicating presence or absence of a threat for each threat category.

The analysis unit 83 may identify the explanatory variable, as a basis for the discrimination result, included in a decision condition that is the base for identification of the discrimination result.

The analysis unit 83 may extract from the decision rules a decision condition that includes at least one or more explanatory variables used to derive the discrimination result among the decision conditions in which the discrimination result matches, calculates a score for each explanatory variable, using the number of explanatory variables included in the extracted decision condition as the denominator and the number of matches of the explanatory variables as the numerator, and identifies the explanatory variable with the highest score as the explanatory variable that has had the greatest influence on the discrimination result.

Figure 14:
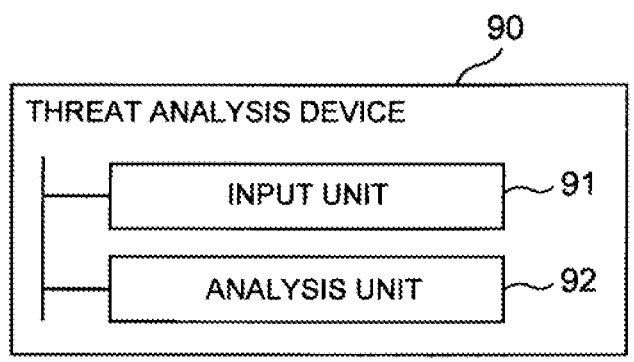
FIG. 14 It depicts a block diagram showing a summarized example of a threat analysis device according to the present invention.

FIG. 14 is a block diagram showing a summarized example of a threat analysis device according to the present invention. The threat analysis device 90 according to the present invention comprises an input unit 91 (for example, analysis information input unit 50) which inputs threat information to be analyzed, and an analysis unit 92 (for example, analysis unit 60) which applies the input threat information to a decision rule to identify a discrimination result of the threat information, and explanatory variable as a basis for the discrimination result, wherein the decision rule specifies the discrimination result depending on a combination of the explanatory variables, and is generated as a result of a rough sets analysis performed using training data that includes the threat information including a plurality of explanatory variables representing a threat event and the discrimination result of discriminating the threat information.

Such a configuration can also automate the analysis of threat information in the point of view of perspective of an analyst.

Figure 15:
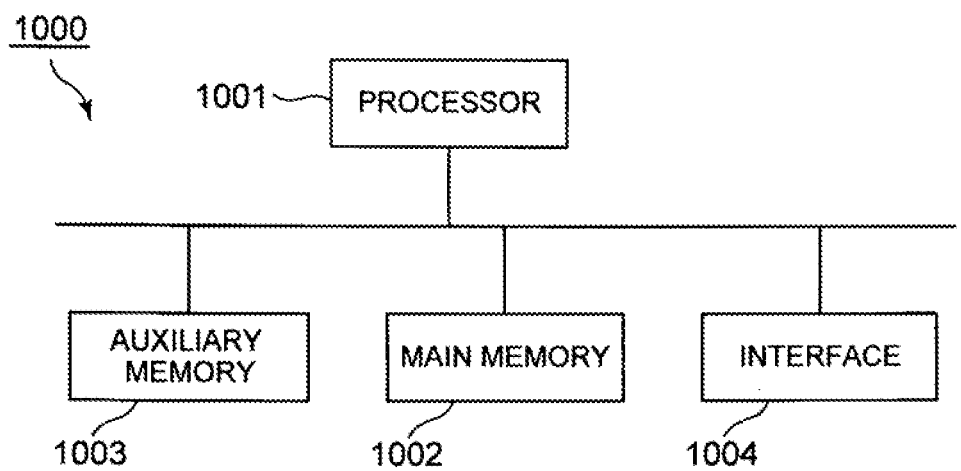
FIG. 15 It depicts a schematic block diagram showing an configuration of a computer for at least one example embodiment.

FIG. 15 is a schematic block diagram showing an configuration of a computer for at least one example embodiment. The computer 1000 includes a processor 1001, a main memory 1002, an auxiliary memory 1003, and an interface 1004.

The above described threat analysis system is implemented in a computer 1000. The operation of each of the above described processing units is stored in an auxiliary memory 1003 in the form of a program (threat analysis program, analysis program). The processor 1001 reads the program from the auxiliary memory 1003 and develops it on the main memory 1002, and executes the above describe processes in accordance with the program.

In at least one example embodiment, the auxiliary storage device 1003 is an example of a non-transitory tangible medium. Other examples of non-transitory tangible media are a magnetic disk, an optical magnetic disk, a CD-ROM (Compact Disc Read-only memory), a DVD-ROM (Read-only memory), semiconductor memory, etc. When the program is delivered to the computer 1000 through a communication line, the computer 1000 receiving the delivery may develop the program to the main memory 1002 and perform the above processes.

The program may also be one for realizing some of the aforementioned functions. Furthermore, the program may be a so-called differential file (differential program), which realizes the aforementioned functions in combination with other programs already stored in the auxiliary memory 1003.

The aforementioned exemplary embodiments can be described as supplementary notes mentioned below, but are not limited to the following supplementary notes.

(Supplementary note 1) A threat analysis system comprising: a rule learning unit which performs rough sets analysis using training data that includes threat information including a plurality of explanatory variables representing a threat event and a discrimination result of discriminating the threat information, to learn a decision rule specifying the discrimination result depending on a combination of the explanatory variables; an input unit which inputs the threat information to be analyzed; and an analysis unit which applies the input threat information to the decision rule to identify the discrimination result of the threat information, and the explanatory variable as a basis for the discrimination result.

(Supplementary note 2) The threat analysis system according to Supplementary note 1, further comprising, a supplement unit which supplements the training data with relevant information identified based on the explanatory variable, wherein the rule learning unit performs the rough sets analysis using supplemented training data, and the input unit inputs the threat information supplemented with the relevant information.

(Supplementary note 3) The threat analysis system according to Supplementary note 2, wherein the supplement unit transforms at least one of the explanatory variable and related information to a true or false value, a character string, a numeric value, a range, or a binary value, based on a predetermined transformation rule, the rule learning unit performs the rough sets analysis using transformed training data, and the input unit inputs the threat information transformed based on the transformation rule.

(Supplementary note 4) The threat analysis system according to any one of Supplementary notes 1 to 3, wherein the rule learning unit learns the decision rule for each type of predetermined explanatory variable included in the threat information, and the analysis unit selects the decision rule according to the explanatory variable included in the input threat information, and applies the threat information to selected decision rule.

(Supplementary note 5) The threat analysis system according to any one of Supplementary notes 1 to 4, wherein the rule learning unit learns the decision rule using the training data including presence or absence of a threat, or possibility of a threat, and the analysis unit applies the input threat information to the decision rule to identify the discrimination result indicating presence or absence of a threat, or possibility of a threat.

(Supplementary note 6) The threat analysis system according to any one of Supplementary notes 1 to 5, wherein the rule learning unit learns the decision rule, for each threat category that is a classification depending on a property of the threat event, using the training data that includes the discrimination result indicating whether or not the threat category is applicable, and the analysis unit applies the input threat information to the decision rule for each of the threat category to identify the discrimination result indicating presence or absence of a threat for each threat category.

(Supplementary note 7) The threat analysis system according to any one of Supplementary notes 1 to 6, wherein the analysis unit identifies the explanatory variable, as a basis for the discrimination result, included in a decision condition that is the base for identification of the discrimination result.

(Supplementary note 8) The threat analysis system according to any one of Supplementary notes 1 to 7, wherein the analysis unit extracts from the decision rules a decision condition that includes at least one or more explanatory variables used to derive the discrimination result among the decision conditions in which the discrimination result matches, calculates a score for each explanatory variable, using the number of explanatory variables included in the extracted decision condition as the denominator and the number of matches of the explanatory variables as the numerator, and identifies the explanatory variable with the highest score as the explanatory variable that has had the greatest influence on the discrimination result.

(Supplementary note 9) A threat analysis device comprising: an input unit which inputs threat information to be analyzed; and an analysis unit which applies the input threat information to a decision rule to identify a discrimination result of the threat information, and explanatory variable as a basis for the discrimination result, wherein the decision rule specifies the discrimination result depending on a combination of the explanatory variables, and is generated as a result of a rough sets analysis performed using training data that includes the threat information including a plurality of explanatory variables representing a threat event and the discrimination result of discriminating the threat information.

(Supplementary note 10) A threat analysis method comprising: performing rough sets analysis using training data that includes threat information including a plurality of explanatory variables representing a threat event and a discrimination result of discriminating the threat information, to learn a decision rule specifying the discrimination result depending on a combination of the explanatory variables; and applying the threat information to be analyzed to the decision rule to identify the discrimination result of the threat information, and the explanatory variable as a basis for the discrimination result.

(Supplementary note 11) The threat analysis method according to Supplementary note 10, further comprising, supplementing the training data with relevant information identified based on the explanatory variable, wherein when the rough sets analysis is performed, supplemented training data is used.

(Supplementary note 12) An analysis method comprising: inputting threat information to be analyzed; and applying the input threat information to a decision rule to identify a discrimination result of the threat information, and explanatory variable as a basis for the discrimination result, wherein the decision rule specifies the discrimination result depending on a combination of the explanatory variables, and is generated as a result of a rough sets analysis performed using training data that includes the threat information including a plurality of explanatory variables representing a threat event and the discrimination result of discriminating the threat information.

(Supplementary note 13) A threat analysis program causing a computer to perform: a rule learning process of performing rough sets analysis using training data that includes threat information including a plurality of explanatory variables representing a threat event and a discrimination result of discriminating the threat information, to learn a decision rule specifying the discrimination result depending on a combination of the explanatory variables; an input process of inputting the threat information to be analyzed; and an analysis process of applying the input threat information to the decision rule to identify the discrimination result of the threat information, and the explanatory variable as a basis for the discrimination result.

(Supplementary note 14) The threat analysis program according to Supplementary note 13, causing the computer to perform: a supplement process of supplementing the training data with relevant information identified based on the explanatory variable, wherein in the rule learning process, the rough sets analysis is performed using supplemented training data, and in the input process, the threat information supplemented with the relevant information is input.

(Supplementary note 15) An analysis program causing a computer to perform: an input process of inputting threat information to be analyzed; and an analysis process of applying the input threat information to a decision rule to identify a discrimination result of the threat information, and explanatory variable as a basis for the discrimination result, wherein the decision rule specifies the discrimination result depending on a combination of the explanatory variables, and is generated as a result of a rough sets analysis performed using training data that includes the threat information including a plurality of explanatory variables representing a threat event and the discrimination result of discriminating the threat information.

While the present invention has been described with reference to the exemplary embodiments, the present invention is not limited to the aforementioned exemplary embodiments. Various changes understandable to those skilled in the art within the scope of the present invention can be made to the structures and details of the present invention.

This application claims priority based on Japanese Patent Application 2018-154674, filed on Aug. 21, 2018, and disclosures of which are incorporated herein in their entirety.

REFERENCE SIGNS LIST

1 Threat Analysis System
10 storage 20 training data input unit
30 decision rule learning unit
40 decision rule storage unit
50 analysis information input unit
60 analysis unit
70 output unit
100 decision rule learning device
200 threat analysis device

What is claimed is:

1. A threat analysis system comprising a hardware processor configured to execute software code to:
perform rough sets analysis using training data that includes threat information including a plurality of explanatory variables representing a threat event and a discrimination result of discriminating the threat information, to learn a decision rule specifying the discrimination result depending on a combination of the explanatory variables;
for each of a plurality of threat information:
input the threat information to be analyzed;
apply the input threat information to the decision rule to identify the discrimination result of the input threat information, and the explanatory variable on which basis the discrimination result was identified, the discrimination result indicating presence or absence of a threat event; and
discard the threat information in response the discrimination result indicating the absence of the threat event,
wherein the threat analysis system provides for improved faster response to each input threat information for which the discrimination result indicates the presence of the threat event, to improve cyber security,
and wherein the rough sets analysis includes:
classifying the training data into groups according to the discrimination results;
comparing, for each training data, the explanatory variables of the training data in one group with the explanatory variables of the training data in other of the groups and identifying the explanatory variables that are different; and
aggregating comparison results by group and excluding the explanatory variables having low frequency.

2. The threat analysis system according to claim 1, wherein the hardware processor is configured to execute the software code to:
supplement the training data with relevant information identified based on the explanatory variable on which basis the discrimination result was identified;
perform the rough sets analysis using supplemented training data; and
input the threat information supplemented with the relevant information.

3. The threat analysis system according to claim 2, wherein the hardware processor is configured to execute the software code to:
transform at least one of the explanatory variable on which basis the discrimination result was identified and related information to a true or false value, a character string, a numeric value, a range, or a binary value, based on a predetermined transformation rule;
perform the rough sets analysis using transformed training data; and
input the threat information transformed based on the transformation rule.

4. The threat analysis system according to claim 3, wherein the hardware processor is configured to execute the software code to:
learn the decision rule for each type of predetermined explanatory variable included in the threat information; and
select the decision rule according to the explanatory variable included in the input threat information and on which basis the discrimination result was identified, and apply the threat information to the selected decision rule.

5. The threat analysis system according to claim 3, wherein the hardware processor is configured to execute the software code to:
learn the decision rule using the training data including presence or absence of a threat, or possibility of the threat; and
apply the input threat information to the decision rule to identify the discrimination result indicating the presence or absence of the threat, or the possibility of the threat.

6. The threat analysis system according to claim 3, wherein the hardware processor is configured to execute the software code to:
learn the decision rule, for a threat category that is a classification depending on a property of the threat event, using the training data that includes the discrimination result indicating whether or not the threat category is applicable; and
apply the input threat information to the decision rule for the threat category to identify the discrimination result indicating presence or absence of a threat for the threat category.

7. The threat analysis system according to claim 2, wherein the hardware processor is configured to execute the software code to:
learn the decision rule for each type of predetermined explanatory variable included in the threat information; and
select the decision rule according to the explanatory variable included in the input threat information and on which basis the discrimination result was identified, and apply the threat information to the selected decision rule.

8. The threat analysis system according to claim 2, wherein the hardware processor is configured to execute the software code to:
learn the decision rule using the training data including presence or absence of a threat, or possibility of the threat; and
apply the input threat information to the decision rule to identify the discrimination result indicating the presence or absence of the threat, or the possibility of the threat.

9. The threat analysis system according to claim 2, wherein the hardware processor is configured to execute the software code to:
learn the decision rule, for a threat category that is a classification depending on a property of the threat event, using the training data that includes the discrimination result indicating whether or not the threat category is applicable; and
apply the input threat information to the decision rule for the threat category to identify the discrimination result indicating presence or absence of a threat for the threat category.

10. The threat analysis system according to claim 1, wherein the hardware processor is configured to execute the software code to:
- learn the decision rule for each type of predetermined explanatory variable included in the threat information; and
- select the decision rule according to the explanatory variable included in the input threat information and on which basis the discrimination result was identified, and apply the threat information to the selected decision rule.

11. The threat analysis system according to claim 10, wherein the hardware processor is configured to execute the software code to:
- learn the decision rule using the training data including presence or absence of a threat, or possibility of the threat; and
- apply the input threat information to the decision rule to identify the discrimination result indicating the presence or absence of the threat, or the possibility of the threat.

12. The threat analysis system according to claim 10, wherein the hardware processor is configured to execute the software code to:
- learn the decision rule, for a threat category that is a classification depending on a property of the threat event, using the training data that includes the discrimination result indicating whether or not the threat category is applicable; and
- apply the input threat information to the decision rule for the threat category to identify the discrimination result indicating presence or absence of a threat for the threat category.

13. The threat analysis system according to claim 1, wherein the hardware processor is configured to execute the software code to:
- learn the decision rule using the training data including presence or absence of a threat, or possibility of the threat; and
- apply the input threat information to the decision rule to identify the discrimination result indicating the presence or absence of the threat, or the possibility of the threat.

14. The threat analysis system according to claim 1, wherein the hardware processor is configured to execute the software code to:
- learn the decision rule, for a threat category that is a classification depending on a property of the threat event, using the training data that includes the discrimination result indicating whether or not the threat category is applicable; and
- apply the input threat information to the decision rule for the threat category to identify the discrimination result indicating presence or absence of a threat for the threat category.

15. The threat analysis system according to claim 1, wherein the hardware processor is configured to execute the software code to:
- identify the explanatory variable, as a basis for the discrimination result, included in a decision condition that is the basis for identification of the discrimination result.

16. The threat analysis system according to claim 1, wherein the hardware processor is configured to execute the software code to:
- extract from the decision rule a decision condition that includes at least one or more explanatory variables used to derive the discrimination result among the decision conditions in which the discrimination result matches, calculate a score for each explanatory variable, using a number of the explanatory variables included in the extracted decision condition as the denominator and the number of matches of the explanatory variables as the numerator, and identify the explanatory variable with the highest score as the explanatory variable that has had a greatest influence on the discrimination result.

17. A threat analysis device comprising a hardware processor configured to execute software code to:
- perform rough sets analysis using training data that includes threat information including a plurality of explanatory variables representing a threat event and a discrimination result of discriminating the threat information, to learn a decision rule specifying the discrimination result depending on a combination of the explanatory variables;
- for each of a plurality of threat information:
  - input the threat information to be analyzed;
  - apply the input threat information to the decision rule to identify the discrimination result of the input threat information, and the explanatory variable on which basis the discrimination result was identified, the discrimination result indicating presence or absence of a threat event; and
  - discard the threat information in response the discrimination result indicating the absence of the threat event,
- wherein the threat analysis system provides for improved faster response to each input threat information for which the discrimination result indicates the presence of the threat event, to improve cyber security,
- and wherein the rough sets analysis includes:
  - classifying the training data into groups according to the discrimination results;
  - comparing, for each training data, the explanatory variables of the training data in one group with the explanatory variables of the training data in other of the groups and identifying the explanatory variables that are different; and
  - aggregating comparison results by group and excluding the explanatory variables having low frequency.

18. A threat analysis method performed by a computer and comprising:
- performing rough sets analysis using training data that includes threat information including a plurality of explanatory variables representing a threat event and a discrimination result of discriminating the threat information, to learn a decision rule specifying the discrimination result depending on a combination of the explanatory variables;
- for each of a plurality of threat information:
  - inputting the threat information to be analyzed;
  - applying the input threat information to the decision rule to identify the discrimination result of the input threat information, and the explanatory variable on which basis the discrimination result was identified, the discrimination result indicating presence or absence of a threat event; and
  - discarding the threat information in response the discrimination result indicating the absence of the threat event,
- wherein the threat analysis system provides for improved faster response to each input threat information for which the discrimination result indicates the presence of the threat event, to improve cyber security, and wherein the rough sets analysis includes:
   classifying the training data into groups according to the discrimination results;
   comparing, for each training data, the explanatory variables of the training data in one group with the explanatory variables of the training data in other of the groups and identifying the explanatory variables that are different; and
   aggregating comparison results by group and excluding the explanatory variables having low frequency.

19. The threat analysis method according to claim 18, further comprising:
   supplementing the training data with relevant information identified based on the explanatory variable on which basis the discrimination result was identified,
   wherein when the rough sets analysis is performed, supplemented training data is used.

\* \* \* \* \*